United States Patent
Morioka

(10) Patent No.: US 11,110,782 B2
(45) Date of Patent: Sep. 7, 2021

(54) AUTOMOTIVE DOOR SEALING STRUCTURE

(71) Applicant: Nishikawa Rubber Co., Ltd., Hiroshima (JP)

(72) Inventor: Masahiro Morioka, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 62 days.

(21) Appl. No.: 16/554,746

(22) Filed: Aug. 29, 2019

(65) Prior Publication Data

US 2020/0086725 A1 Mar. 19, 2020

(30) Foreign Application Priority Data

Sep. 13, 2018 (JP) .............................. JP2018-171368

(51) Int. Cl.
*B60J 10/277* (2016.01)
*B60J 10/75* (2016.01)

(52) U.S. Cl.
CPC ............ *B60J 10/277* (2016.02); *B60J 10/75* (2016.02)

(58) Field of Classification Search
CPC ........................................................ B60J 10/75
See application file for complete search history.

(56) References Cited

U.S. PATENT DOCUMENTS

| 4,817,336 A * | 4/1989 | Kisanuki .................. B60J 10/21 |
| | | 296/154 |
| 4,894,954 A * | 1/1990 | Nozaki .................. B60J 10/235 |
| | | 49/373 |
| 6,401,394 B2 * | 6/2002 | Nozaki ..................... B60J 10/18 |
| | | 49/377 |
| 6,502,832 B2 * | 1/2003 | Goto ...................... F16J 15/025 |
| | | 277/642 |
| 10,220,691 B2 * | 3/2019 | Masumoto ............... B60J 10/22 |
| 10,239,399 B2 * | 3/2019 | Masumoto ............. B60J 5/0411 |
| 10,279,667 B2 * | 5/2019 | Masumoto ............... B60J 10/76 |
| 10,286,768 B2 * | 5/2019 | Ogawa ..................... B60J 10/75 |
| 10,434,857 B2 * | 10/2019 | Walawender ............ B60J 10/76 |
| 2017/0225552 A1 * | 8/2017 | Masumoto ............ E06B 7/2305 |
| 2017/0232827 A1 * | 8/2017 | Ogawa ..................... B60J 10/75 |
| | | 49/495.1 |
| 2019/0135096 A1 * | 5/2019 | Nishimoto ............... B60J 10/50 |

FOREIGN PATENT DOCUMENTS

| EP | 2316681 B1 * | 6/2017 | ............. B60J 10/50 |
| GB | 2178463 A * | 2/1987 | ............. B60J 10/76 |
| JP | 2017-144990 A | 8/2017 | |

* cited by examiner

*Primary Examiner* — Catherine A Kelly
(74) *Attorney, Agent, or Firm* — Renner, Otto, Boisselle & Sklar, LLP

(57) ABSTRACT

The present disclosure improves sealing properties between a glass run and a sealing member provided at an inner peripheral flange of a belt line, if the sealing member of the belt line and the glass run are individual members, to provide high sound insulation properties. The belt line sealing member includes an upper sealing lip and a lower seal lip, which are vertically spaced apart from each other. At an end of the belt line sealing member, a molded part is continuously provided from the upper sealing lip through an inner wall to the lower sealing lip.

5 Claims, 11 Drawing Sheets

FRONT ←              → REAR

FRONT ←          → REAR

OUTSIDE VEHICLE CABIN ← → INSIDE VEHICLE CABIN

OUTSIDE VEHICLE CABIN ← → INSIDE VEHICLE CABIN

AUTOMOTIVE DOOR SEALING STRUCTURE

CROSS-REFERENCE TO RELATED APPLICATION

This application claims priority to Japanese Patent Application No. 2018-171368 filed on Sep. 13, 2018, the entire disclosure of which is incorporated by reference herein.

BACKGROUND

The present disclosure relates to a sealing structure provided for an automotive door. In particular, the present disclosure belongs to the technical field of a structure sealing the gap between a glass run and a belt line.

A typical automotive door includes a window frame that supports the peripheral edge of a window glass. The window frame is provided with front and rear glass runs, which are sealing members extending vertically in contact with the peripheral edge of the window glass (see, e.g., Japanese Unexamined Patent Publication No. 2017-144990). The belt line of the automotive door disclosed in Japanese Unexamined Patent Publication No. 2017-144990 is provided with an inner weather strip, which is a member independent from the glass run and extending along the belt line in a longitudinal direction of the vehicle. While the front and rear ends of the inner weather strip are in contact with the front and rear glass runs, respectively, the inner weather strip is assembled to the door panel.

The inner weather strip of Japanese Unexamined Patent Publication No. 2017-144990 includes an upper sealing lip and a lower sealing lip. The upper and lower sealing lips come into sliding contact with the interior surface of the window glass. At the front end of the upper sealing lip, an end surface wall is provided in contact with the glass run. The end surface wall is formed at the longitudinal end of the inner weather strip as follows. The longitudinal end of the inner weather strip formed by extrusion molding is pressed and cut, and then inserted into an injection mold to be formed into an end of the inner weather strip through injection molding.

The inner weather strip of Japanese Unexamined Patent Publication No. 2017-144990 is provided with the upper and the lower sealing lips, which are both in sliding contact with the window glass, to form a double sealing structure.

However, a study of how outside noise enters a vehicle cabin shows that the noise, which comes not only through the gap between the inner weather strip and the window glass, but also through the gap between the inner weather strip and the glass run, may be a problem. Specifically, when the outside noise enters the inside of the automotive door, the noise then enters the vehicle cabin through the gap between the inner weather strip and the glass run, and is then transmitted inside the vehicle cabin at a side of an occupant to easily reach the ears of the occupant.

In Japanese Unexamined Patent Publication No. 2017-144990, the end surface wall is provided at the front end of the upper sealing lip of the inner weather strip by injection molding. The end surface wall may be molded into a shape, which comes into contact with the glass run, to seal the gap between the front end of the upper sealing lip and the glass run.

However, no end surface wall is provided at the front end of the lower sealing lip by injection molding. Instead, an extruded part is merely pressed and cut, which leaves a gap between the front end of the lower sealing lip and the glass run. It is thus difficult to reliably provide sealing properties. In other words, although the upper and lower sealing lips are provided, only the upper sealing lip seals the gap between the inner weather strip and the glass run, thereby forming no double sealing structure. This structure may fail to provide high sound insulation properties.

The present disclosure is conceived in view of the problem, and intends to improve sealing properties between a glass run and a sealing member provided for a belt line, if the sealing member of the belt line and the glass run are individual members, to provide high sound insulation properties.

Solution to the Problems

In order to achieve the objective, the present disclosure provides a double sealing structure between a glass run and a sealing member provided for a belt line.

A first aspect of the present disclosure provides an automotive door sealing structure includes: a glass run assembled to a window frame of an automotive door to extend vertically in sliding contact with an edge of the window glass, the window frame supporting a window glass that moves up and down; and a belt line sealing member assembled closer to an inside of a vehicle cabin than to the window glass at an inner peripheral flange of a belt line of the automotive door to extend in a longitudinal direction of a vehicle. The belt line sealing member includes an upper sealing lip and a lower seal lip, which extend in the longitudinal direction of the vehicle in sliding contact with an interior surface of the window glass, and are vertically spaced apart from each other. At one end of the belt line sealing member in the longitudinal direction of the vehicle, a molded part molded with a molding die that operates to open and close and coming into contact with the glass run in the longitudinal direction of the vehicle is continuously provided from the upper sealing lip through an inner wall to the lower sealing lip.

In this configuration, the glass run is assembled to the window frame, and the belt line sealing member is assembled to the belt line. Then, the upper and lower sealing lips of the belt line sealing member come into sliding contact with the interior surface of the window glass. This doubly seals the gap between the belt line sealing member and the window glass. In addition, the molded part of the belt line sealing member comes into contact with the glass run in the longitudinal direction of the vehicle to seal the gap between the belt line sealing member and the glass run. The molded part is continuous from the upper sealing lip through the inner wall to the lower sealing lip. Thus, the gap between the belt line sealing member and the glass run is sealed at the lower sealing lip as well as at the upper sealing lip. Accordingly, the double sealing structure provides high sound insulation properties.

According to a second aspect of the present disclosure, the molded part includes a lower projection projecting upward from one end of the lower sealing lip in the longitudinal direction of the vehicle, and coming into contact with the glass run in the longitudinal direction of the vehicle. The molded part also includes a cutout extending downward from a connector provided between the lower protrusion and an intermediate part.

In this configuration, the lower projection extends upward from the one end of the lower sealing lip. This provides a sufficient contact area with the front glass run, thereby further improving the sealing properties. On the other hand, there is a problem if the lower projection extending upward is formed at one end of the lower sealing lip. When a molding die is to be removed between the upper and lower projections, the lower projection does not easily open to make it difficult to remove the molding die. In the present disclosure, the cutout extends downward from the connector provided between the lower protrusion and the intermediate part. Thus, when the molding die is removed between the upper and lower projections, the lower projection easily opens to facilitate the removal of the molding die.

According to a third aspect of the present disclosure, the lower projection is deformed to bend upward and inside the vehicle cabin in contact with the window glass. When the lower projection bends upward and inside the vehicle cabin in contact with the window glass, the cutout has a width narrower than that before bend.

In this configuration, when the lower projection bends upward and inside the vehicle cabin in contact with the window glass, the cutout has the width narrower to improve the sealing properties.

According to a fourth aspect of the present disclosure, when the lower projection bends upward and inside the vehicle cabin in contact with the window glass, an upper end of the cutout closes.

In this configuration, when the lower projection bends upward and inside the vehicle cabin in contact with the window glass, the upper end of the cutout closes to improve the sealing properties.

According to a fifth aspect of the present disclosure, the lower sealing lip includes a deformation starting part as a starting point, at which the lower sealing lip is in contact with the window glass to be deformed to bend upward and inside the vehicle cabin. A lower end of the cutout is continuous with the deformation starting part.

In this configuration, the lower end of the cutout is continuous with the deformation starting part. In contact with the window glass, the lower projection easily bends upward and inside the vehicle cabin.

According to a sixth aspect of the present disclosure, the deformation starting part is a recess extending in the longitudinal direction of the vehicle. A lower end of the cutout is continuous with the recess.

In this configuration, the lower end of the cutout is continuous with the recess. In contact with the window glass, the lower projection more easily bends upward and inside the vehicle cabin.

SUMMARY

According to the first aspect of the present disclosure, at the one end of the belt line sealing member, the molded part, which comes into contact with the glass run in the longitudinal direction of the vehicle, is continuously provided from the upper sealing lip through the inner wall to the lower sealing lip. This improves sealing properties between the sealing member of the belt line and the glass run to provide high sound insulation properties. According to the second aspect of the present disclosure, the lower projection projects upward from the one end of the lower sealing lip to improve the sealing properties. In such a case, the molding die is easily removed from the place between the upper and lower projections, since the cutout extends downward from the connector provided between the lower protrusion and the intermediate part. The cutout provided at the connector reduces the force generated when the lower sealing lip comes into sliding contact with the window glass, and the sliding noise of the glass.

According to the third aspect of the present disclosure, the bend of the lower projection upward and inside the vehicle cabin reduces the width of the cutout to improve the sealing properties.

According to the fourth aspect of the present disclosure, the bend of the lower projection upward and inside the vehicle cabin closes the upper end of the cutout to provide continuous sealing.

According to the fifth aspect of the present disclosure, the lower projection easily bends upward and inside the vehicle cabin in contact with the window glass.

According to the sixth aspect of the present disclosure, the lower projection more easily bends upward and inside the vehicle cabin in contact with the window glass.

DETAILED DESCRIPTION

Now, an embodiment of the present disclosure will be described below in detail with reference to the drawings. The following description of an advantageous embodiment is only an example in nature, and is not intended to limit the scope, applications, or use of the present disclosure.

Figure 1:
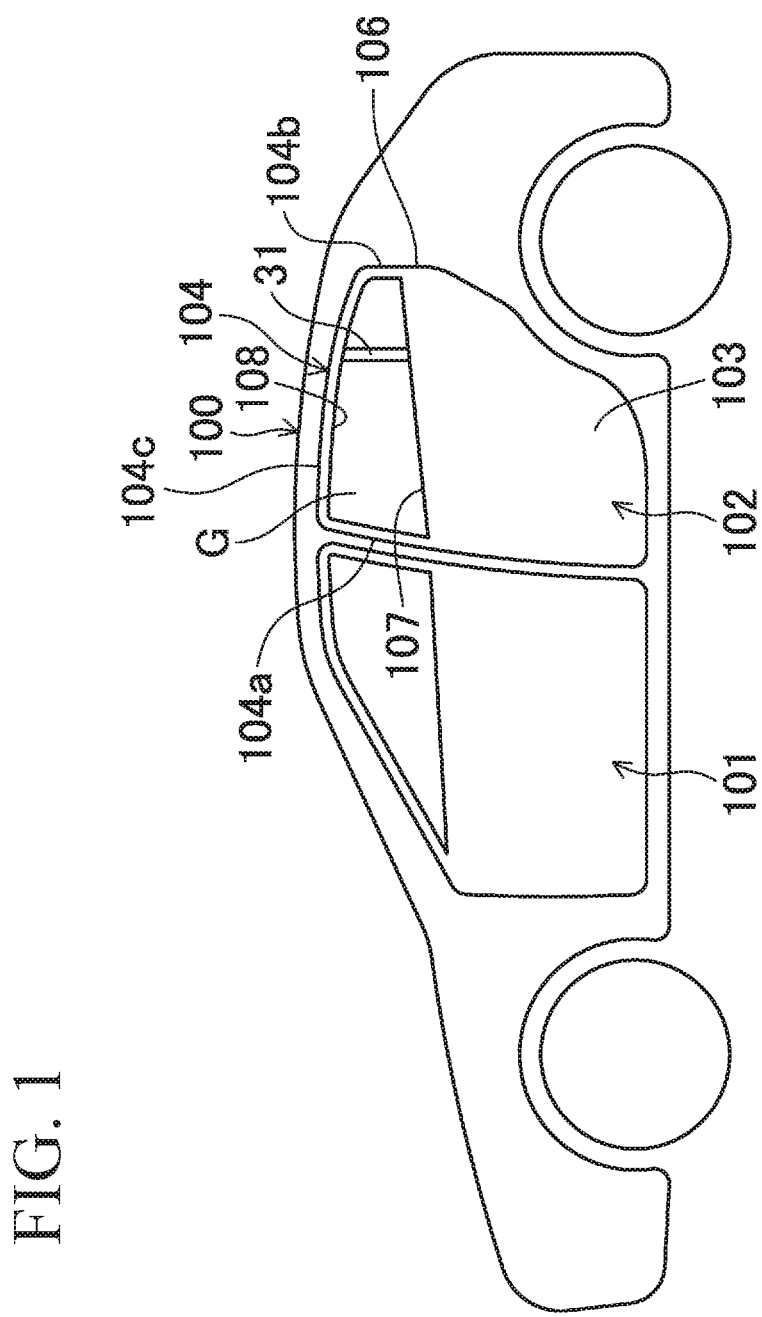
FIG. 1 is a left side view of a motor vehicle including an automotive door according to an embodiment of the present disclosure.

FIG. 1 is a left side view of a motor vehicle 100 according to an embodiment of the present disclosure. Front doors 101 and rear doors 102 are disposed on the right and left sides of the vehicle 100. The front doors 101 and the rear doors 102 are automotive doors according to the present disclosure. The front ends of the doors are rotatably attached to a vehicle body via hinges (not shown). In this embodiment, an example will be described where the present disclosure is applied to the rear doors 102. The configuration is not limited thereto. The present disclosure is applicable to the front doors 101. The present disclosure is applicable to any of the right and left front and rear doors 101 and 102. In the description of this embodiment, the side closer to the front of the vehicle is simply referred to as "front," and the side closer to the rear of the vehicle is simply referred to as "rear."

(Configuration of Rear Door)

Figure 2:
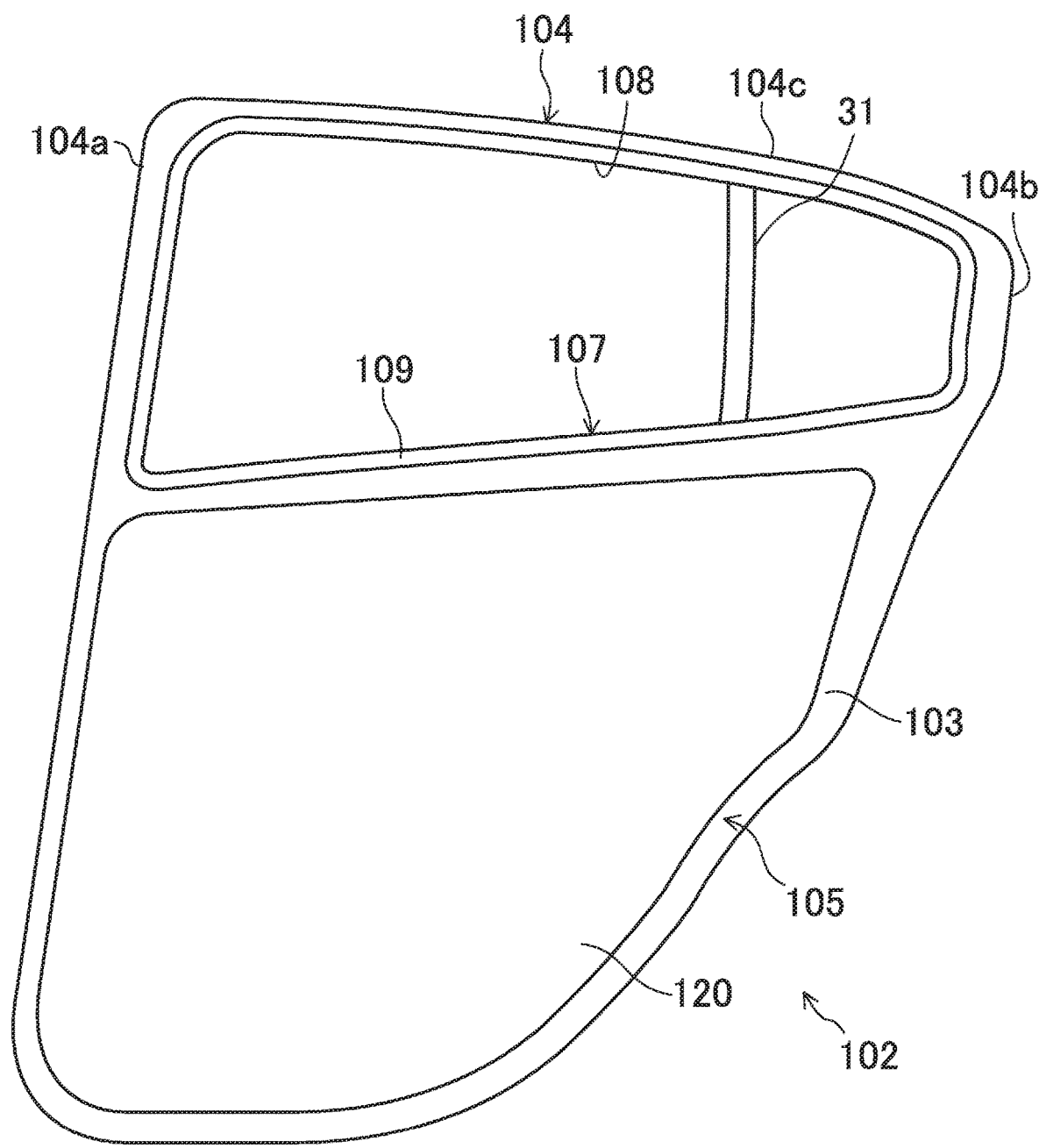
FIG. 2 is a side view of an inner panel for a right rear door as viewed from the inside of a vehicle cabin.

Each of the rear doors 102 includes a door body 103 constituting a substantially lower half of the rear door 102, and a window frame 104 constituting a substantially upper half. A window glass G is provided for the rear door 102 to be movable up and down. The front end of the door body 103 is attached to the vehicle body via the hinges. The door body 103 houses inside, for example, a window regulator (not shown) for raising and lowering the window glass G and a rail. The window glass G moves down to open. In this state, the most part of the window glass G is housed inside the door body 103. Each rear door 102 includes an inner panel (a door panel) 105 (the one on the right of the vehicle is shown in FIG. 2) and an outer panel (a door panel) 106 (the one on the left of the vehicle is shown in FIG. 1). The inner panel 105 is a press molded product that constitutes the interior side of the right rear door 102. The outer panel 106 is a press molded product that constitutes the exterior side of the rear door 102. The inner panels 105 and the outer panels 106 are made of, for example, a steel plate. The right and left panels are symmetrical.

As shown in FIG. 1, the window frame 104 is a frame-like member that supports the periphery of the window glass G, and may also be referred to as a sash. The window frame 104 defines an opening 108 for the window glass. The window frame 104 includes a front vertical frame side 104a, a rear vertical frame side 104b, and an upper frame side 104c. The front vertical frame side 104a extends vertically at the front of the rear door 102, and has a cross-section open rearward. The rear vertical frame side 104b extends vertically at the rear of the rear door 102. The lower parts of the front and rear vertical frame sides 104a and 104b reach the inside of the door body 103. In addition, a support member 31 extends vertically between the front and rear vertical frame sides 104a and 104b in a position closer to the rear. The front of the support member 31 has a cross-section open forward. The front vertical frame side 104a and the support member 31 are configured to guide the window glass G to the inside of the door body 103, when the window glass G is lowered. The upper frame side 104c extends from the upper end of the front vertical frame side 104a to the upper end of the rear vertical frame side 104b, and is open downward. The upper frame side 104c is inclined downward toward the rear in correspondence with the shape of the window glass G.

A belt line 107 is a part of the rear door 102, which extends along the lower edge of the opening 108 for the window glass. In this embodiment, the belt line 107 extends while being inclined upward toward the rear, that is, downward toward the front. This is because of the design requirements of the vehicle. The belt line 107 may extend substantially horizontally. As shown in FIG. 2, an inner peripheral flange 109 is provided on the peripheral edge of the opening 108 for the window glass of the inner panel 105, that is, on substantially the entire inner periphery of the window frame 104. The lower part of the inner peripheral flange 109 extends longitudinally.

As shown in FIG. 2, the inner panel 105 includes a part constituting the window frame 104 and a part constituting the door body 103, which are integrally formed by press molding.

Figure 3:
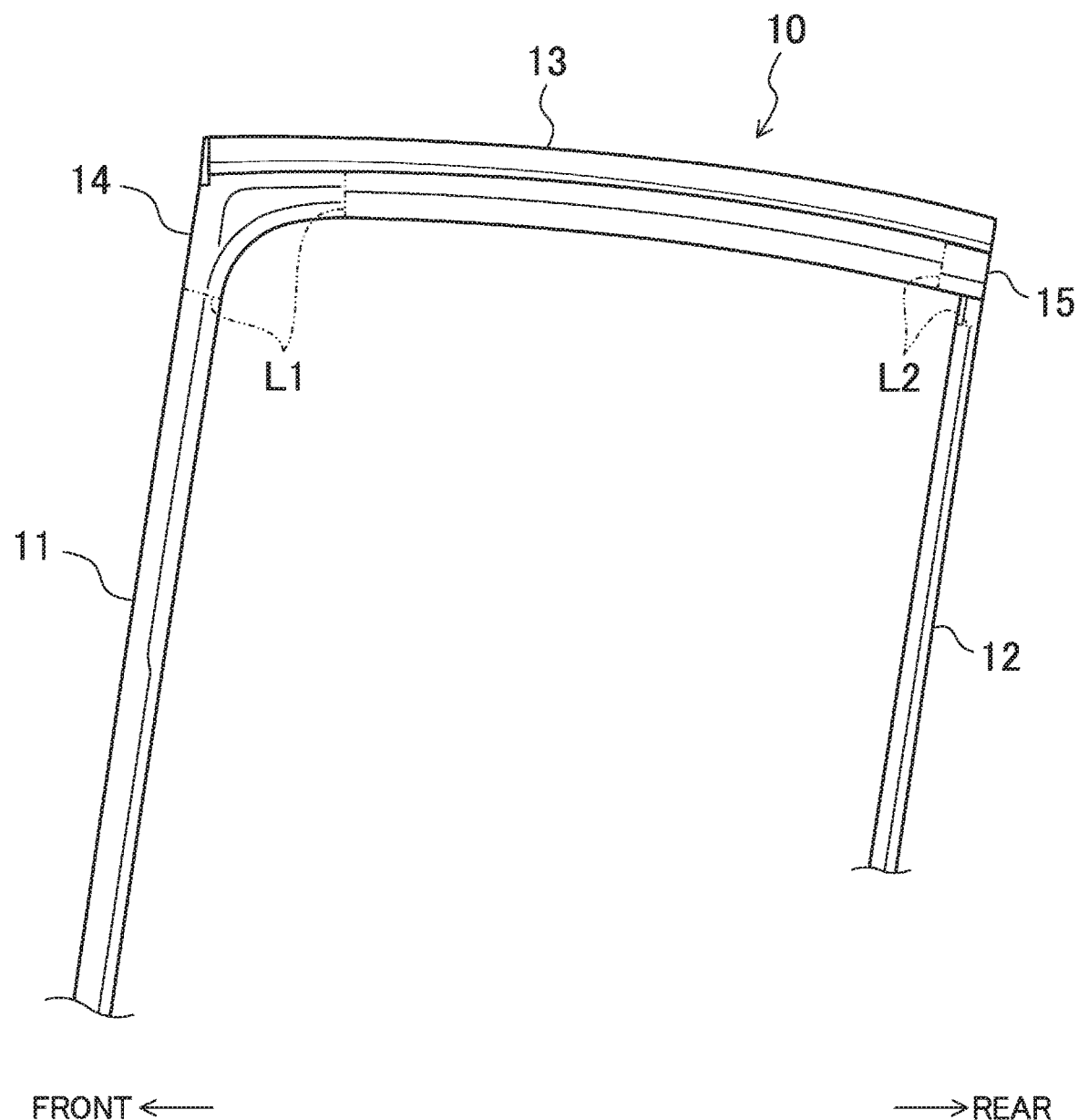
FIG. 3 is a side view of a glass run for the right rear door as viewed from the inside of the vehicle cabin.
Figure 4:
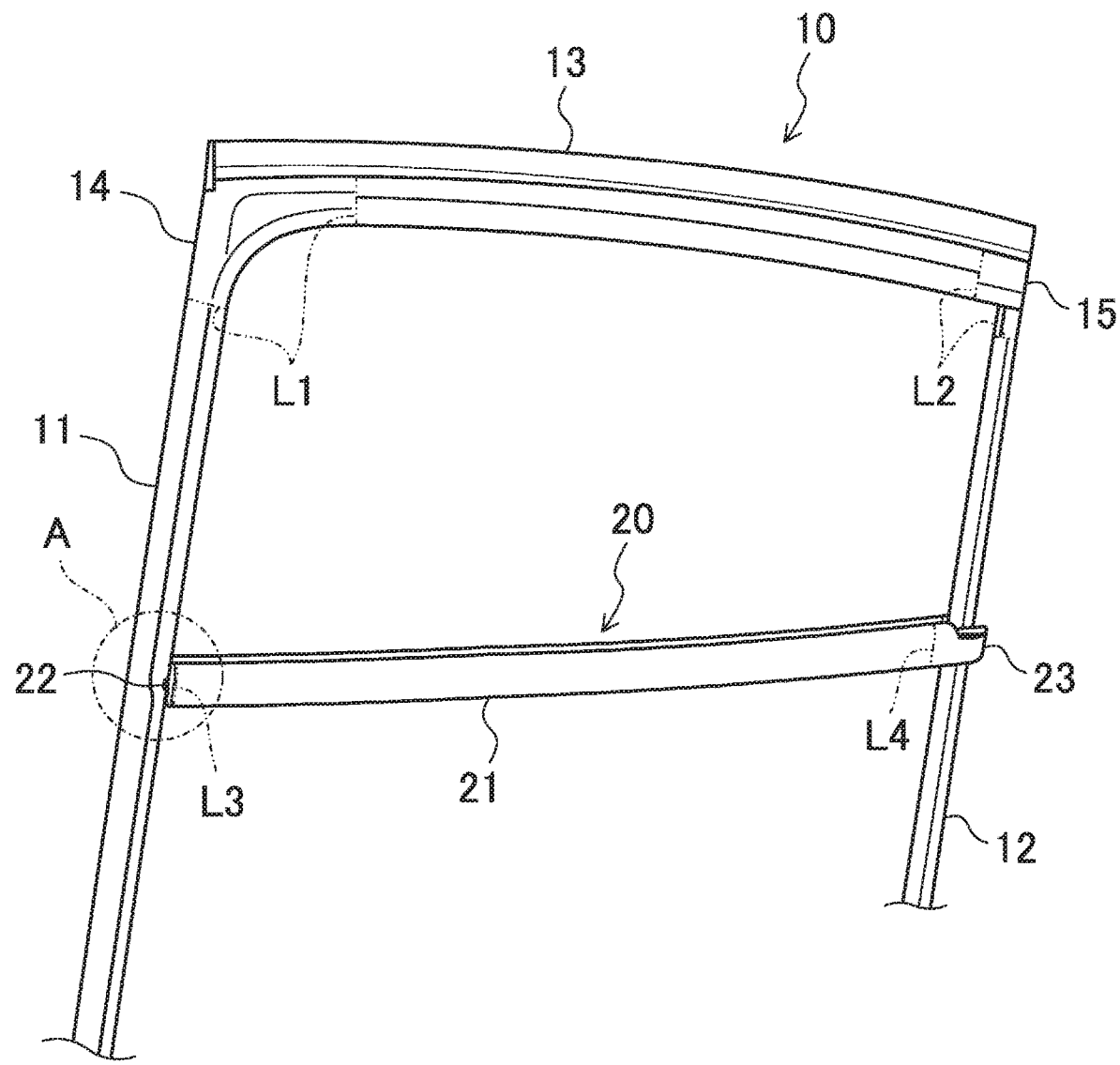
FIG. 4 is a side view of the glass run for the right rear door and a belt line sealing member as viewed from the inside of the vehicle cabin.
Figure 5:
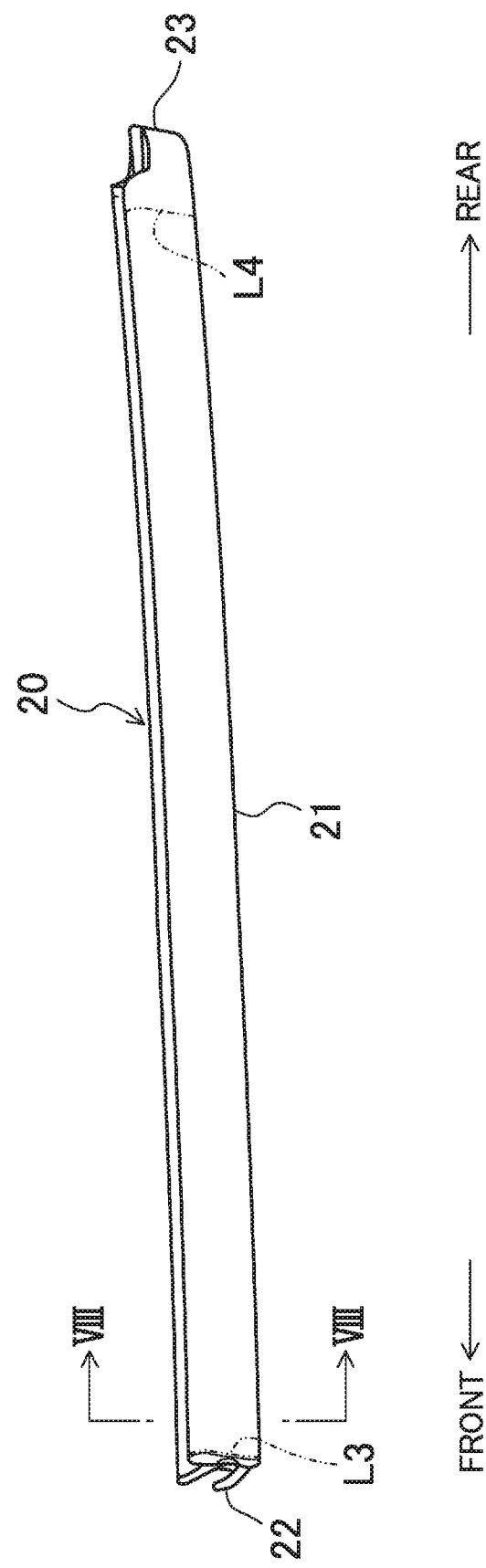
FIG. 5 is a side view of the belt line sealing member of FIG. 4 as viewed from the inside of the vehicle cabin.

The rear door 102 is provided with a sealing structure including a glass run 10 shown in FIG. 3 and a belt line sealing member shown in FIGS. 4 and 5. The detail of the sealing structure will be described below.

(Configuration of Glass Run)

Next, the glass run 10 shown in FIG. 3 will be described. The glass run 10 includes a front glass run 11, a rear glass run 12, and an upper side 13, and in addition, a front corner 14 and a rear corner 15. The front glass run 11 is assembled to the front vertical frame side 104a of the rear door 102 to seal the gap between the front edge of the window glass G and the front vertical frame side 104a, and made of an elastic material. Examples of the elastic material include thermoplastic elastomers (TPEs) such as styrene thermoplastic elastomer (TPS) and olefin thermoplastic elastomer (TPO), and rubbers such as ethylene propylene diene rubber (EPDM). Although a non-foam material is generally used as the elastic material, a fine foam material may be used to reduce the weight as long as the elastic material is reliably rigid.

The rear glass run 12 is assembled to the support member 31 of the rear door 102 to seal the gap between the rear edge of the window glass G and the support member 31, and made of the same or similar elastic material as the front glass run 11. The upper side 13 of the glass run is attached to the upper frame side 104c of the rear door 102 to seal the gap between the upper edge of the window glass G and the upper frame side 104c. The upper side 13 is made of the same or similar elastic material as the front glass run 11.

Each of the front glass run 11, the rear glass run 12, and the upper side 13 of the glass run is extruded to have a substantially constant cross-section across both of the longitudinal ends. On the other hand, the front corner 14 and the rear corner 15 are molded with a molding die (not shown) that operates to open and close. The front corner 14 is provided at the front of the upper part of the glass run 10, and connects the upper end of the front glass run 11 to the front end of the upper side 13 of the glass run. The rear corner 15 is provided at the rear of the upper part of the glass run 10, and connects the upper end of the rear glass run 12 to the rear end of the upper side 13 of the glass run. Imaginary lines L1 represent the boundaries between the front corner 14 and the front glass run 11, and between the front corner 14 and the upper side 13 of the glass run. Imaginary lines L2 represent the boundaries between the rear corner 15 and the rear glass run 12, and between the rear corner 15 and the upper side 13 of the glass run.

Figure 6:
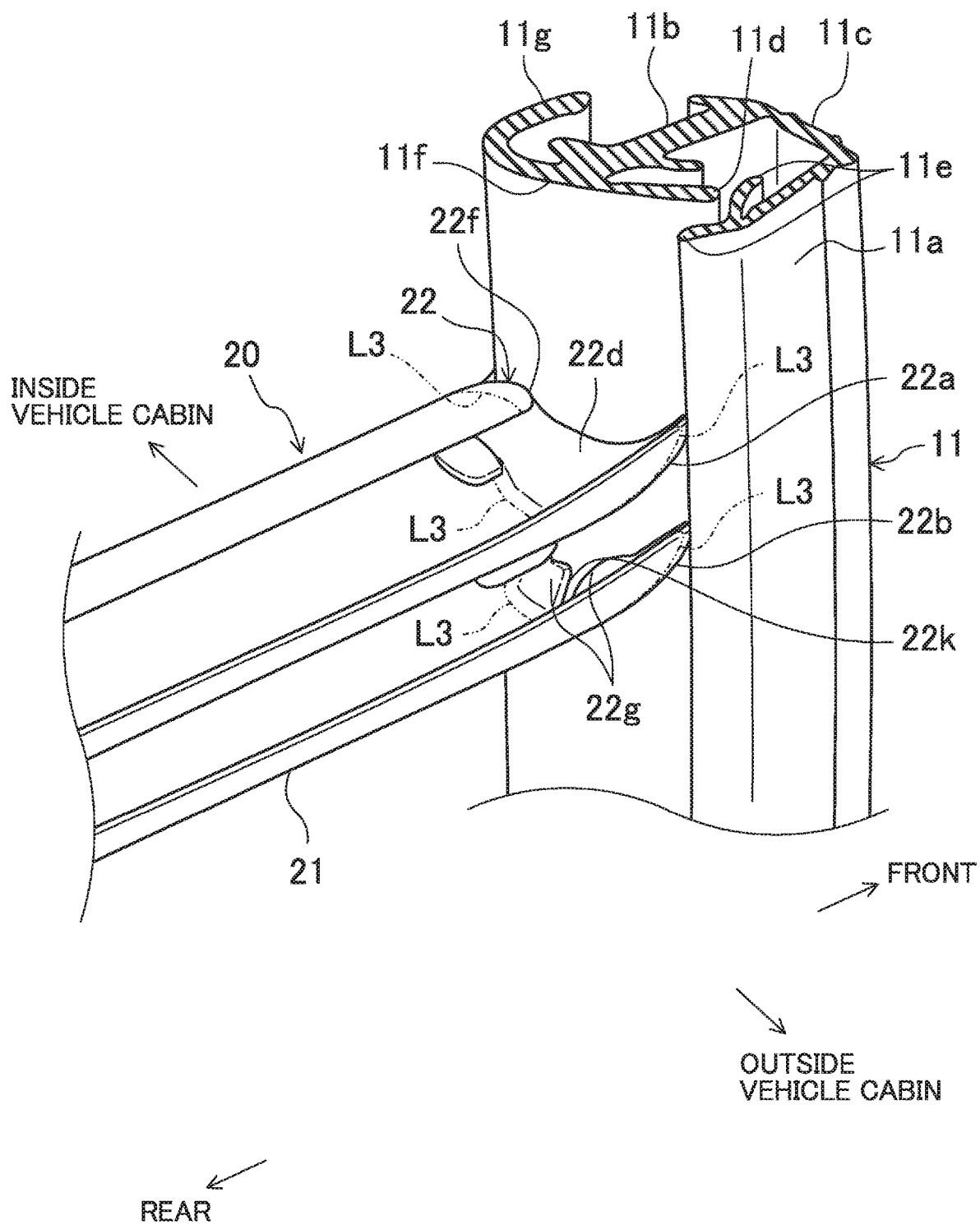
FIG. 6 is a perspective view illustrating an enlarged part A of FIG. 4 as viewed from the outside of the vehicle cabin.

FIG. 6 illustrates the cross-sectional shape of the front glass run 11. The front glass run 11 includes an outer wall 11a, an inner wall 11b, and a connecting wall 11c. The outer wall 11a is disposed inside the front vertical frame side 104a (shown in FIG. 2) closer to the outside of the vehicle cabin. The inner wall 11b is disposed inside the front vertical frame side 104a (shown in FIG. 2) closer to the inside of the vehicle cabin. The connecting wall 11c connects the outer wall 11a and the inner wall 11b, and has a cross-section open rearward. The outer wall 11a and the inner wall 11b extend along the inner surface of the vertical frame side 104a. An outer sealing lip 11e, which is in sliding contact with the exterior surface of the window glass G, is provided at the rear end of the outer wall 11a, which is the distal end. An inner sealing lip 11d, which is in sliding contact with the interior surface of the window glass G, is provided on the exterior surface of the inner wall 11b. A bent plate 11g is provided at a rear end 11f of the inner wall 11b, which is the distal end. When the window glass G moves up and down, the front glass run 11 comes into sliding contact with the front edge of the window glass G (not shown).

The rear glass run 12 has the same or similar cross-section as the front glass run 11, which is open forward, that is opposite to the front glass run 11. When the window glass G moves up and down, the rear glass run 12 comes into sliding contact with the rear edge of the window glass G. The upper side 13 (not shown) of the glass run has a cross-section open downward, and basically has the same or similar cross-section as the front and rear glass runs 11 and 12.

(Configuration of Belt Line Sealing Member)

Next, the belt line sealing member 20 will be described. As shown in FIG. 5, the belt line sealing member 20 is substantially in the form of a straight line extending from the front glass run 11 to the rear glass run 12, when assembled to the rear door 102, as shown in FIG. 4. Specifically, the belt line sealing member 20 is assembled to the inner peripheral flange 109 of the belt line 107 of the rear door 102, which is represented by the imaginary line in FIG. 9. The belt line sealing member 20 is located closer to the inside of the vehicle cabin than to the window glass G. The belt line sealing member 20 extends longitudinally along the belt line 107.

As shown in FIG. 5, the belt line sealing member 20 includes an extruded part 21, a front molded part 22, and a rear molded part 23. The extruded part 21 is extruded to have a substantially constant cross-section across both of the longitudinal ends (both the front and rear ends in this example). The front molded part 22 is molded by a molding die (shown in FIG. 11), which operates to open and close. The rear molded part 23 is molded by a molding die (not shown), which operates to open and close.

As shown in FIG. 4, the front molded part 22 is provided at the front of the belt line sealing material 20, and is integrally molded at the front end of the extruded part 21. The front molded part 22 comes into contact with the front glass run 11 from the rear. The contact between the front molded part 22 and the front glass run 11 reliably provides sealing properties between the belt line sealing material 20 and the front glass run 11. An imaginary line L3 represents the boundary between the front molded part 22 and the extruded part 21.

The rear molded part 23 is provided at the rear of the belt line sealing material 20, and is integrally molded at the rear end of the extruded part 21. The rear molded part 23 comes into contact with the rear glass run 12 from the front. The contact between the rear molded part 23 and the rear glass run 12 reliably provides sealing properties between the belt line sealing material 20 and the rear glass run 12. An imaginary line L4 represents the boundary between the rear molded part 23 and the extruded part 21.

Figure 8:
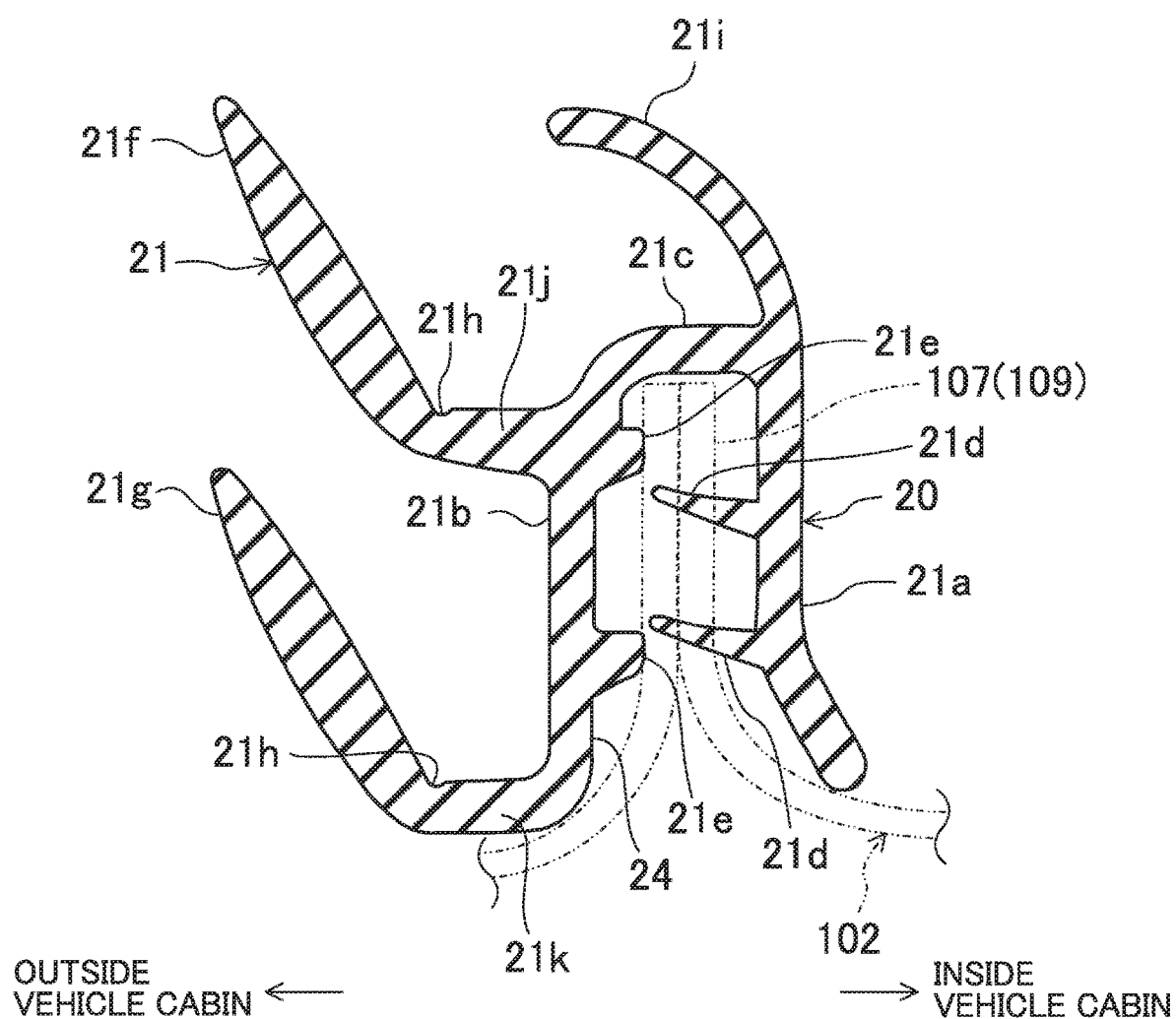
FIG. 8 is a cross-sectional view taken along line VIII-VIII of FIG. 5.

As shown in FIG. 8, which is a cross-sectional view taken along line VIII-VIII of FIG. 5, the extruded part 21 of the belt line sealing member 20 includes an interior wall 21a, an exterior wall 21b, and an upper wall 21c. The interior wall 21a is located closer to the inside of the vehicle cabin than the inner peripheral flange 109 (shown in FIG. 9) of the belt line 107. The exterior wall 21b is located closer to the outside of the vehicle cabin than the inner peripheral flange 109 of the belt line 107. Both the interior wall 21a and the exterior wall 21b extend vertically. The upper wall 21c is continuous with the upper portions of the interior and exterior walls 21a and 21b. The interior wall 21a, the exterior wall 21b, and the upper wall 21c form a cross-section opening downward.

The space between the lower portions of the interior and exterior walls 21a and 21b is open downward. Accordingly, in the belt line sealing material 20, a panel insertion groove 24 into which the inner peripheral flange 109 of the belt line 107 is inserted is formed to be open downward. The panel insertion groove 24 is formed across the longitudinal ends of the belt line sealing member 20.

The exterior surface of the interior wall 21a is provided with a pair of inner locking lips 21d and 21d, which extend longitudinally and are vertically spaced apart from each other. The interior surface of the exterior wall 21b is provided with a pair of outer locking projections 21e and 21e, which extend longitudinally and are vertically spaced apart from each other. The inner locking lips 21d and 21d are in elastic contact with the inner peripheral flange 109 of the belt line 107, which is inserted into the space between the interior and exterior walls 21a and 21b, that is, in the panel insertion groove 24. The inner peripheral flange 109 comes into contact with the outer locking projections 21e and 21e to be locked.

An upper sealing lip 21f is provided at the upper portion of the exterior surface of the exterior wall 21b via an upper connector 21j. A lower sealing lip 21g is provided at the lower portion of the exterior surface of the exterior wall 21b via a lower connector 21k. The upper and lower sealing lips project outside the vehicle cabin. The upper and lower sealing lips 21f and 21g are made of the same or similar elastic material as the glass run 10, extend longitudinally, and are vertically spaced apart from each other. The upper sealing lip 21f is inclined upward toward the outside of the vehicle cabin. The exterior part of the upper sealing lip 21f comes into sliding contact with the interior surface of the window glass G to reliably provide sealing properties. Like the upper sealing lip 21f, the lower sealing lip 21g is also inclined upward toward the outside of the vehicle cabin. The exterior part of the lower sealing lip 21g comes into sliding contact with the interior surface of the window glass G to reliably provide sealing properties. In contact with the window glass G, the upper and lower sealing lips 21f and 21g are elastically deformed to bend upward and inside the vehicle cabin. The sliding contact of the upper and lower sealing lips 21f and 21g with the interior surface of the window glass G provides a double sealing structure between the interior surface of the window glass G and the belt line sealing member 20.

At the proximal end of the lower sealing lip 21g, a deformation starting part 21h is provided as the starting point, at which the lower sealing lip 21g is in contact with the window glass G to be deformed to bend upward and inside the vehicle cabin. The deformation starting part 21h is a recess extending longitudinally. The recessed deformation starting part 21h allows the lower sealing lip 21g to easily bend upward and inside the vehicle cabin in contact with the window glass G. This reduces the force when the lower sealing lip 21g comes into sliding contact with the window glass G, and the sliding noise of the glass. Like the lower sealing lip 21g, the upper sealing lip 21f is provided with a deformation starting part 21h.

An upper lip 21i projecting upward is provided to the upper wall 21c toward the inside of the vehicle cabin. This upper lip 21i extends outside the vehicle cabin, as it goes upward.

Each of the outer wall 11a, the inner wall 11b, and the connecting wall 11c of the extruded part 21 of the belt line sealing member 20 may include a core member (not shown). The core member is made of a hard material harder than the elastic material (e.g., TPE such as TPS or TPO or a rubber such as EPDM, with a JIS A hardness within the range from 60 degrees to 80 degrees) of the upper and lower sealing lips 21f and 21g. The hard material of the core member may be, for example, an aluminum alloy, a steel material, a stainless steel, a hard resin (e.g., a resin mixed with talc or glass fibers). The core member is longitudinally not divided and continuous. Even when being pulled by a worker at the time of assembly, no dimensional change occurs longitudinally. That is, the core member has a sufficient longitudinal strength to be unstretchable. On the other hand, none of the front and rear molded parts 22 and 23 includes a core material. These parts are made only of the elastic material.

Figure 7:
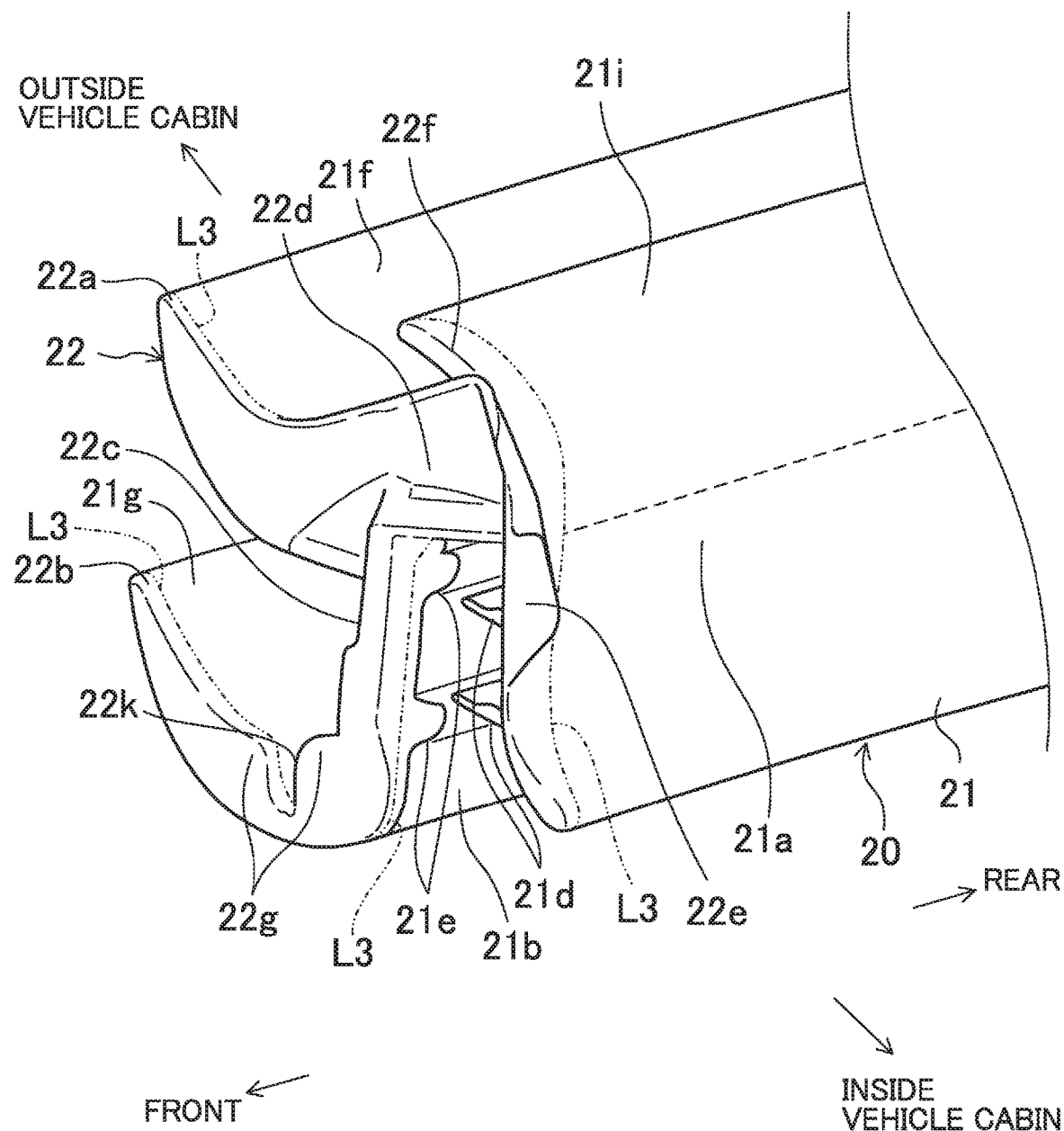
FIG. 7 is a perspective view of the belt line sealing member of FIG. 6 as viewed from the front and the inside of the vehicle cabin.

As shown in FIG. 7, the front molded part 22 is continuous at least from the upper sealing lip 21f through the exterior wall 21b to the lower sealing lip 21g. That is, the front molded part 22 includes an upper projection 22a and a lower projection 22b. The upper projection 22a is in the shape of a lip integral with the front end of the upper sealing lip 21f, and projects upward. The lower projection 22b is in the shape of a lip integral with the front end of the lower sealing lip 21g, and projects upward.

Here, the front molded part 22 of the belt line sealing member 20 abuts on the front glass run 11 in a positional relationship shown in FIG. 6. For this reason, each of the front ends of the upper and lower projections 22a and 22b is formed in a curve that projects forward as it goes from the bottom to the top to run along the curve of the inner sealing lip 11d.

As shown in FIG. 7, in this embodiment, the front molded part 22 further includes an intermediate part 22c, an upper part 22d, an inner part 22e, and a lip 22f. The intermediate part 22c is integrally molded at the front end of the exterior wall 21b. The upper part 22d is in the shape of a lip integrally molded at the front end of the upper wall 21c. The inner part 22e is integrally molded at the front end of the interior wall 21a. The lip 22f is integrally molded at the front end of the upper lip 21i.

The intermediate part 22c is located between the upper and lower projections 22a and 22b, and extends vertically. The upper end of the intermediate part 22c is continuous with the interior end of the upper projection 22a. The lower end of the intermediate part 22c is continuous with the interior end of the lower projection 22b via a connector 22g extending transversely. Accordingly, the upper projection 22a, the intermediate part 22c, and the lower projection 22b are vertically continuous with each other at the front end of the extruded part 21.

Further, the upper part 22d extends transversely in the shape of a lip projecting upward. The exterior end of the upper part 22d is continuous with the interior end of the upper projection 22a. In addition, the inner part 22e extends vertically. The upper end of the inner part 22e is continuous with the interior end of the upper part 22d. Further, the lower end of the lip 22f is continuous with the interior end of the upper part 22d.

Here, the front molded part 22 of the belt line sealing member 20 abuts on the front glass run 11 in a positional relationship shown in FIG. 6. For this reason, each of the front ends of the upper part 22d, the connector 22g, and the inner part 22e is formed in a curve to run along the curve composed of: the inner sealing lip 11d; the rear end 11f as the distal end of the inner wall 11b; and the bent plate 11g.

Accordingly, the upper projection 22a, the lower projection 22b, the intermediate part 22c, the connector 22g, the upper part 22d, the inner part 22e, and the lip 22f are continuous with each other and form the front molded part 22 to cover the front end of the extruded part 21. As shown in FIG. 6, the curve of the front end of the front molded part 22 comes into contact with the curve composed of the inner sealing lip 11d, the rear end 11f as the distal end of the inner wall 11b, and the bent plate 11g, which are parts of the front glass run 11 closer to the inside of the vehicle cabin than the window glass G. Then, the curve is elastically deformed to leave only a significantly small gap between the front glass run 11 and the front molded part 22.

Figure 9:
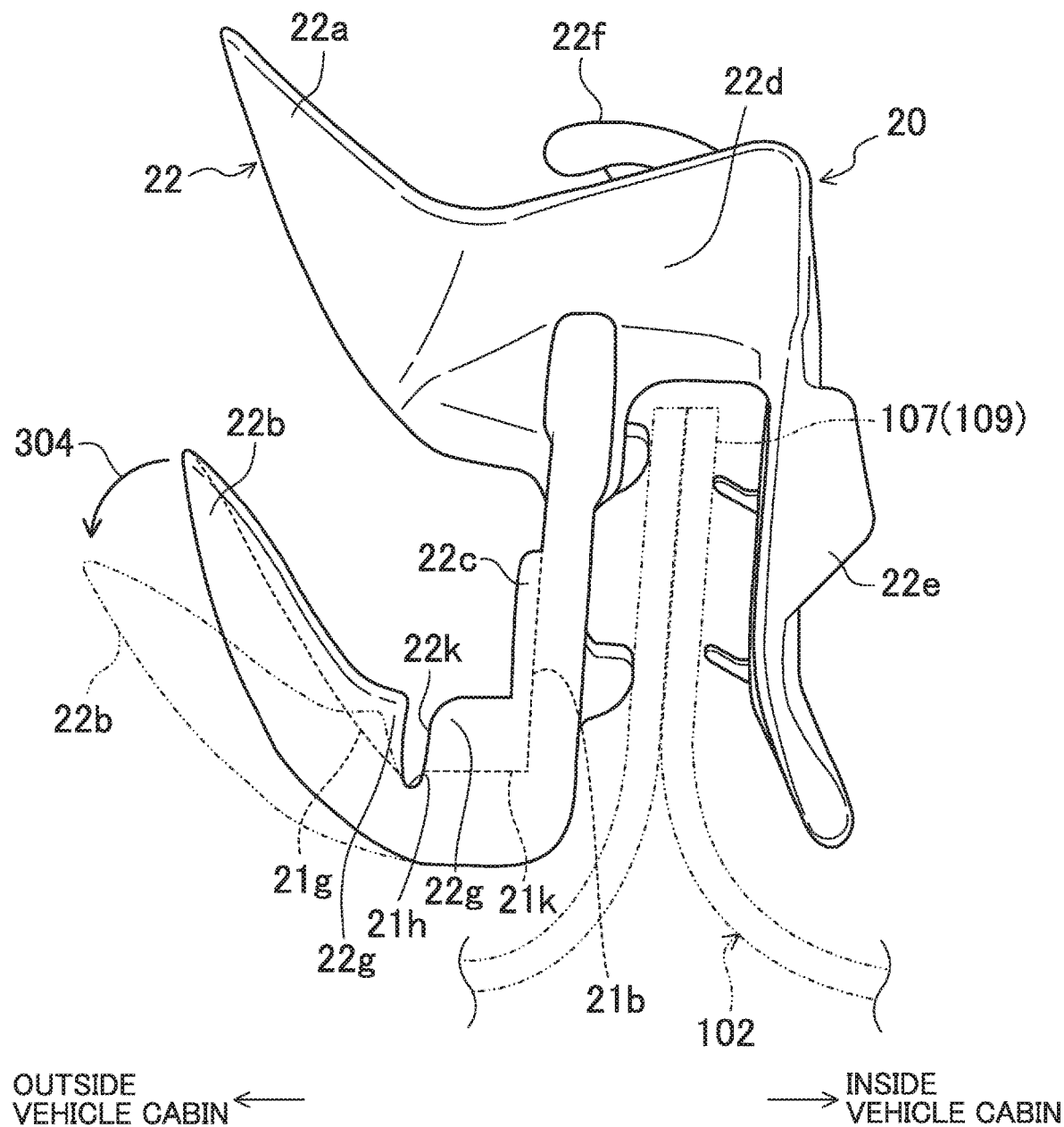
FIG. 9 is a front view of the belt line sealing member of FIG. 6.

In FIG. 9, a broken line represents a part of the extruded part 21 of the belt line sealing member 20 shown in FIG. 8. The part includes the exterior surface of the exterior wall 21b, the interior surface of the lower sealing lip 21g, and the upper surface of the lower connector 21k. That is, the upper surface line of the connector 22g at the end of the front molded part 22 is located higher than the broken line of the extruded part 21. This part serves as an additional wall of the connector 22g, which extends transversely. In the longitudinal direction of the vehicle, the additional wall has a thickness set to be easily bent and deformed in elastic contact with the front glass run 11. Therefore, the connector 22g including the additional wall leaves only a significantly smaller gap between the front glass run 11 and the front molded part 22.

In this embodiment, as shown in FIG. 9, a cutout 22k, which is one of the features of the present disclosure, is formed in the front molded part 22. Specifically, the cutout 22k extends downward from the connector 22g between the lower projection 22b and the intermediate part 22c of the front molded part 22. The cutout 22k is formed to facilitate the removal of the molding dies and to reduce the reaction force in contact with the window glass G. The lower end of the cutout 22k is continuous with the deformation starting part 21h of the extruded part 21. In this embodiment, the deformation starting part 21h is the recess, which is thus continuous with the lower end of the cutout 22k.

Figure 11:
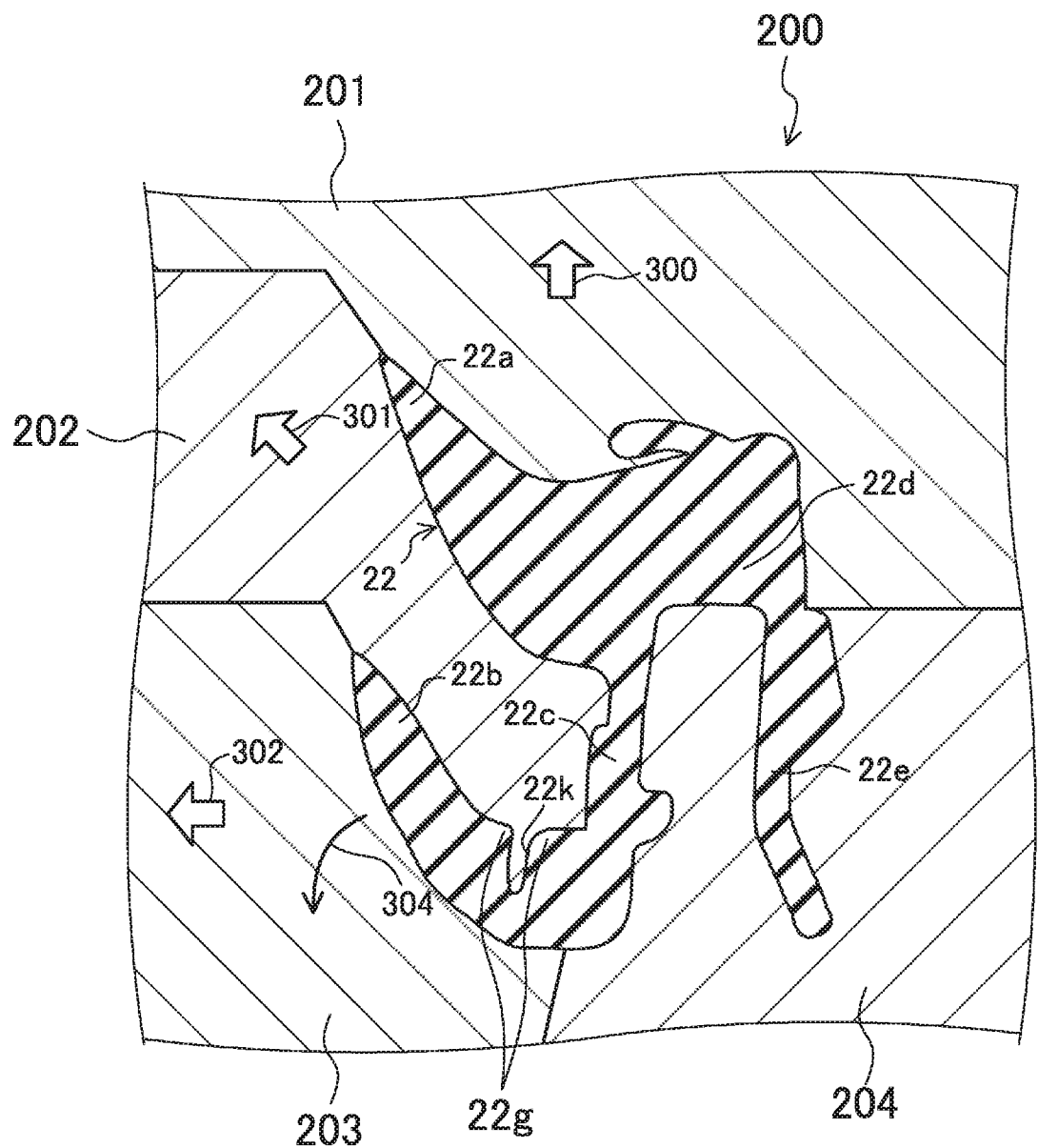
FIG. 11 is a cross-sectional view illustrating molding of a molded part of the belt line sealing member of FIG. 9.

How to facilitate the removal of the molding dies will be described with reference to FIG. 11. FIG. 11 illustrates a molding die layout of a molding die 200 for molding the front molded part 22. The molding die 200 includes a first molding die 201, a second molding die 202, a third molding die 203, and a fourth molding die 204. The fourth molding die 204 is a fixed mold. A molding die driver (not shown) is provided to move the first, second, and third molding dies 201, 202, and 203 in the directions indicated by arrows 300, 301, and 303, respectively. The first molding die 201 is a molding die for molding the upper surface of the front molded part 22. The second molding die 202 is located between the upper and lower projections 22a and 22b to mold the lower surface of the upper projection 22a and the upper surface of the lower projection 22b. The third molding die 203 is a molding die for molding the lower surface of the lower projection 22b.

While the first, second, third, and fourth molding dies 201, 202, 203, and 204 are closed, the material is supplied to the cavity. When the material is solidified, the first, second, and third molding dies 201, 202, and 203 are moved in the directions indicated by the arrows 300, 301, and 302, respectively, to open. At this time, if the second molding die 202 is forcibly moved in the direction indicated by the arrow 301, a problem such as breakage of the connector 22g or deformation of the lower projection 22b may occur. This is because the second molding die 202 is located between the upper and lower projections 22a and 22b.

To address the problem, the cutout 22k is formed at the connector 22g in this embodiment. As indicated by the imaginary lines in FIG. 9, the width of the cutout 22k increases such that the lower projection 22b is easily deformed downward and outside the vehicle cabin as indicated by an arrow 304. Accordingly, at the removal of the molds shown in FIG. 11, the lower projection 22b is easily deformed downward and outside the vehicle cabin as indicated by the arrow 304. As a result, the molding dies can be easily removed.

Figure 10:
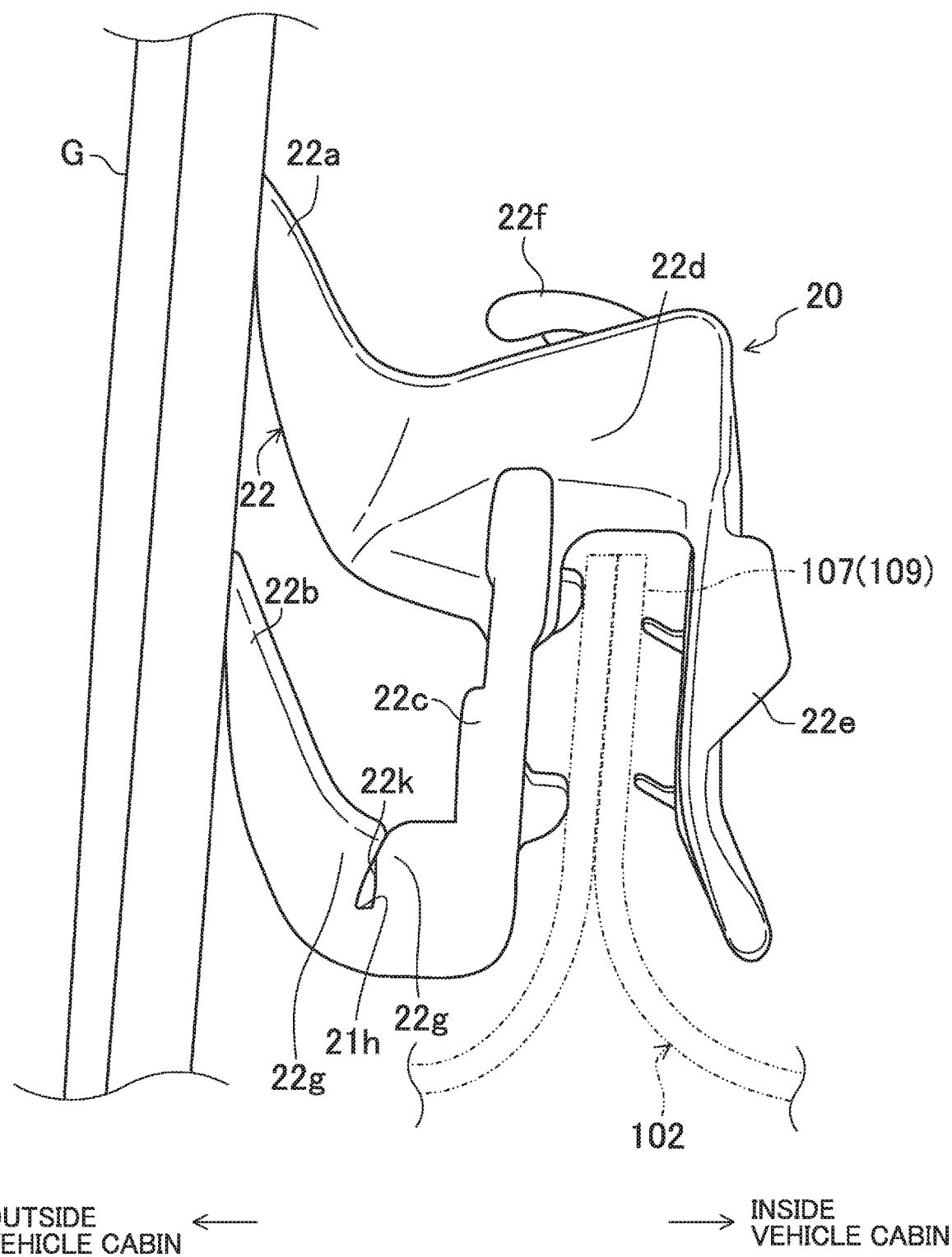
FIG. 10 is a view corresponding to FIG. 9 and illustrating the belt line sealing member in contact with a window glass.

As shown in FIG. 9, when the window glass G is not in contact with the belt line sealing member 20, the cutout 22k of the connector 22g has substantially the same width as that in the molding. On the other hand, as shown in FIG. 10, when the window glass G is in contact with the belt line sealing member 20, the lower projection 22 bends upward and inside the vehicle cabin due to the contact with the window glass G. Thus, the cutout 22k of the connector 22g has a narrower width than the width before the bent. In this embodiment, the upper end of the cutout 22k is formed to substantially close when the lower projection 22b bends upward and inside the vehicle cabin in contact with the window glass G. Note that, when the lower projection 22b comes into contact with the window glass G, the upper end of the cutout 22k may slightly open.

The cutout 22k formed at the connector 22g decreases the reaction force produced when the lower projection 22b comes into contact with the window glass G. This reduces the sliding noise of the glass. In addition, since the cutout 22k is so small as to substantially close when the window glass G is closed, there is little sound coming from the cutout 22k.

Advantages of Embodiment

As described above, according to the sealing structure of the automotive door of this embodiment, when the front glass run 11 is assembled to the window frame 104 and the belt line sealing member 20 is assembled to the inner peripheral flange 109 of the belt line 107. Then, the upper and lower sealing lips 21f and 21g of the belt line sealing member 20 come into sliding contact with the interior surface of the window glass G. This configuration doubly seals the gap between the belt line seal member 20 and the window glass G. In addition, the front molded part 22 of the belt line sealing member 20 longitudinally comes into contact with the front glass run 11 to seal the gap between the belt line sealing member 20 and the front glass run 11. The front molded part 22 is continuous from the upper sealing lip 21f to the lower sealing lip 21g. Thus, the gap between the belt line sealing member 20 and the front glass run 11 is sealed at the lower sealing lip 21g as well as at the upper sealing lip 21f. Accordingly, the double sealing structure provides high sound insulation properties.

Further, the lip-like lower projection 22b, which extends upward from the front end of the lower sealing lip 21g, is provided in the front molded part 22. This provides a sufficient contact area with the front glass run 11, thereby further improving the sealing properties. On the other hand, there is a problem if the lower projection 22b extending upward is formed at the front end of the lower sealing lip 21g. When the second molding die 202 shown in FIG. 11 is to be removed between the upper and lower projections 22a and 22b, the lower projection 22b does not easily open to make it difficult to remove the second molding die 202. In this embodiment, the cutout 22k extends downward from the connector 22g provided between the lower projection 22b and the intermediate part 22c. Thus, when the second molding die 202 is to be removed between the upper and lower projections 22a and 22b, the lower projection 22b easily opens to facilitate the removal of the second molding die 202.

The embodiment described above is a mere example in all respects and shall not be interpreted in a limited manner. Any modification and change equivalent to the scope of claims fall within the scope of the present disclosure.

As described above, the sealing structure of the automotive door according to the present disclosure is applicable, for example, in individually assembling a glass run and a belt line sealing member to doors disposed on the sides of a motor vehicle.

What is claimed is:

1. An automotive door sealing structure, comprising:
a glass run assembled to a window frame of an automotive door to extend vertically in sliding contact with an edge of a window glass, the window frame supporting the window glass that moves up and down; and
a belt line sealing member assembled closer to an inside of a vehicle cabin than to the window glass at an inner peripheral flange of a belt line of the automotive door to extend in a longitudinal direction of a vehicle, wherein
the belt line sealing member includes an upper sealing lip and a lower seal lip, which extend in the longitudinal direction of the vehicle in sliding contact with an interior surface of the window glass, and are vertically spaced apart from each other,
at one end of the belt line sealing member in the longitudinal direction of the vehicle, a die-molded part that operates to open and close and coming into contact with the glass run in the longitudinal direction of the vehicle is continuously provided from the upper sealing lip through an inner wall to the lower sealing lip,
the die-molded part includes a lower projection projecting upward from one end of the lower sealing lip in the longitudinal direction of the vehicle, and coming into contact with the glass run in the longitudinal direction of the vehicle, and
a cutout extending downward from a connector provided between the lower protrusion and an intermediate part.

2. The automotive door sealing structure of claim 1, wherein
the lower projection is deformed to bend upward and toward the inside of the vehicle cabin in contact with the window glass, and
when the lower projection bends upward and toward the inside of the vehicle cabin in contact with the window glass, the cutout has a width narrower than the width before bent.

3. The automotive door sealing structure of claim 2, wherein
when the lower projection bends upward and toward the inside of the vehicle cabin in contact with the window glass, an upper end of the cutout closes.

4. The automotive door sealing structure of claim 1, wherein
the lower sealing lip includes a deformation starting part as a starting point, at which the lower sealing lip is in contact with the window glass to be deformed to bend upward and toward the inside of the vehicle cabin, and
a lower end of the cutout is continuous with the deformation starting part.

5. The automotive door sealing structure of claim 4, wherein
the deformation starting part is a recess extending in the longitudinal direction of the vehicle, and
the lower end of the cutout is continuous with the recess.

* * * * *